United States Patent [19]

Walker et al.

[11] Patent Number: 5,239,469

[45] Date of Patent: Aug. 24, 1993

[54] METHOD OF DETECTING A DEFLATED TIRE ON A VEHICLE

[75] Inventors: John C. Walker, Coldfield; Lavinder S. Rehal, Coventry, both of Great Britain

[73] Assignee: Sumitomo Rubber Industries Ltd., Hyogo, Japan

[21] Appl. No.: 646,260

[22] Filed: Jan. 28, 1991

[30] Foreign Application Priority Data

Feb. 9, 1990 [GB] United Kingdom ............... 9002924

[51] Int. Cl.$^5$ .............................................. B60C 23/00
[52] U.S. Cl. ........................... 364/424.03; 73/146.5; 340/442; 340/444
[58] Field of Search ............... 364/558, 565; 340/442, 340/443, 444; 73/146.2–146.5

[56] References Cited

U.S. PATENT DOCUMENTS

| | | | |
|---|---|---|---|
| 3,613,075 | 10/1971 | Griffiths et al. | 340/444 |
| 3,691,524 | 9/1972 | Frost et al. | 340/444 |
| 4,224,597 | 9/1980 | DiCecio | 340/444 |
| 4,355,298 | 10/1982 | Jessup | 340/444 |
| 4,876,528 | 10/1989 | Walker et al. | 340/442 |

FOREIGN PATENT DOCUMENTS

| | | | |
|---|---|---|---|
| 0291217 | 11/1988 | European Pat. Off. | 340/444 |
| 0033772 | 3/1979 | Japan | 340/444 |
| 0045205 | 3/1984 | Japan | 340/444 |

*Primary Examiner*—Thomas G. Black

[57] ABSTRACT

A method of detecting a partially deflated pneumatic tire on a vehicle having four tires each mounted on a wheel including the steps of sensing the angular velocity of each wheel and producing a signal proportional thereto, processing the four signals in a processing unit which subtracts the sum of the signals from one pair of diagonally opposite wheels from the sum of the signals from the other pair of diagonally opposite wheels, sensing when the magnitude of the result is between 0.05% and 0.6% of the mean of the two sums to produce a signal factor and when said signal factor is present operating a warning device to indicate a tire is partially or completely deflated wherein the angular velocity of each wheel is measured simultaneously by a pulse generator providing a digital signal of more than twenty pulses per revolution of the wheel and a second signal of a single pulse per revolution of the wheel and the two angular velocity signals are both used. The method may also compare the signal for each wheel with the average of all four wheels and if the difference is greater than 0.1%, a deflation is indicated for allowing the detection of which wheel is deflated. Multi-pulse and single pulse detection may be selected according to speed and both may be used simultaneously.

14 Claims, 1 Drawing Sheet

METHOD OF DETECTING A DEFLATED TIRE ON A VEHICLE

BACKGROUND OF THE INVENTION

This invention relates to a method of detecting a deflated tire on a vehicle and provides a system suitable for cars and trucks and the like.

European Patent Publication No. 291217 describes a system primarily aimed at vehicles having electronic anti-lock braking systems which use for each wheel a signal generator which gives a multiple signal. The deflation warning system in the European Patent Publication is an add-on system.

In our co-pending application filed the same day as this case, a deflation warning system is described similar to that in the above European Patent Publication. However, the system in the co-pending application uses a single pulse angular velocity measuring system for each wheel. In the single pulse system each wheel has a simple generator which gives a single pulse each time the wheel completes a rotation and the angular velocity is derived by timing the distance between successive pulses. This system has some advantages over the multi-pulse system of European Publication 291217.

Both systems however have disadvantages. In the case of the multi-pulse system already published, the system only works satisfactorily above a certain threshold speed which is determined primarily by the number of pulses per revolution of each wheel and the overall accuracy or smoothness of the signal from the wheel speed generators. The latter system overcomes this low speed threshold but has limitations in higher speed sensitivity due to the computer power necessary to deal with the very short times involved. The latter case provides a first solution to this sensitivity problem by changing the rate at which the reference clock for the timing operates at high speeds, but this first solution is not fully adequate to overcome all conditions of use particularly for very high speed vehicles where both high and low speed sensitivity is required. Furthermore the detection speed of the two systems, i.e. the delay from the time when a tire pressure reaches the threshold and the time when a warning is given, varies at different speeds of the vehicle and so it is not possible with one of the systems alone to give the most efficient combination.

SUMMARY OF THE INVENTION

It is an object of the present invention to overcome the above disadvantages of both the above systems.

Accordingly one aspect of the present invention provides a method of detecting a partially deflated pneumatic tire on a vehicle having four tires each mounted on a wheel, comprising the steps of sensing the angular velocity of each wheel and producing a signal proportional thereto, processing the four signals in a processing unit which subtracts the sum of the signals for one pair of diagonally opposite wheels from the sum of the signals for the other pair of diagonally opposite wheels, sensing when the magnitude of the result is between 0.05% and 0.6% of the mean of the two sums to produce a signal factor and when said signal factor is present operating a warning device to indicate a tire is partially or completely deflated wherein the angular velocity of each wheel is measured simultaneously by a pulse generator providing a digital signal of more than twenty pulses per revolution of the wheel and a second signal of a single pulse per revolution of the wheel and the two angular velocity signals are both used.

Preferably the processing unit also compares the signals for each of the four wheels in turn with the signals from each of the other wheels and senses when one of said signals is different from the average of all signals by more than 0.1% and in the event that this signal and the other signal factors are present indicates a tire is partially or completely deflated. This method step allows the sensing unit to determine which of the wheels is deflated and to produce a signal accordingly so that the driver is advised of the particular wheel which is deflated as well as the fact that he has a puncture.

The angular velocity signals used at any instant may be either the multi-pulse or single pulse derived signals selected according to the speed of the vehicle at the time concerned selected. The vehicle speed is determined by using one of the systems.

Alternatively both systems of monitoring may be operated throughout the running of the vehicle and the sensing or processing unit compares the final results of both monitoring systems and only indicates a deflation when both systems indicate a relative deflation in a tire.

Whilst two separate pulse generating systems can be used on each wheel, one generating a multi-pulse signal and the other a single pulse, it is preferred to have a multi-pulse signal generator associated with each wheel and to derive the single pulse signal from the same generator by omitting intermediate pulses so that only one pulse per revolution is actually counted for the single pulse operation in the monitoring unit.

DESCRIPTION OF THE DRAWINGS

Further aspects of the invention will become apparent from the following description of one example of the invention in conjunction with the attached diagrammatic FIG. 1 which is a block diagram showing the calculation stages for the processing unit.

DETAILED DESCRIPTION OF THE PREFERRED EMBODIMENTS

Figure 1:
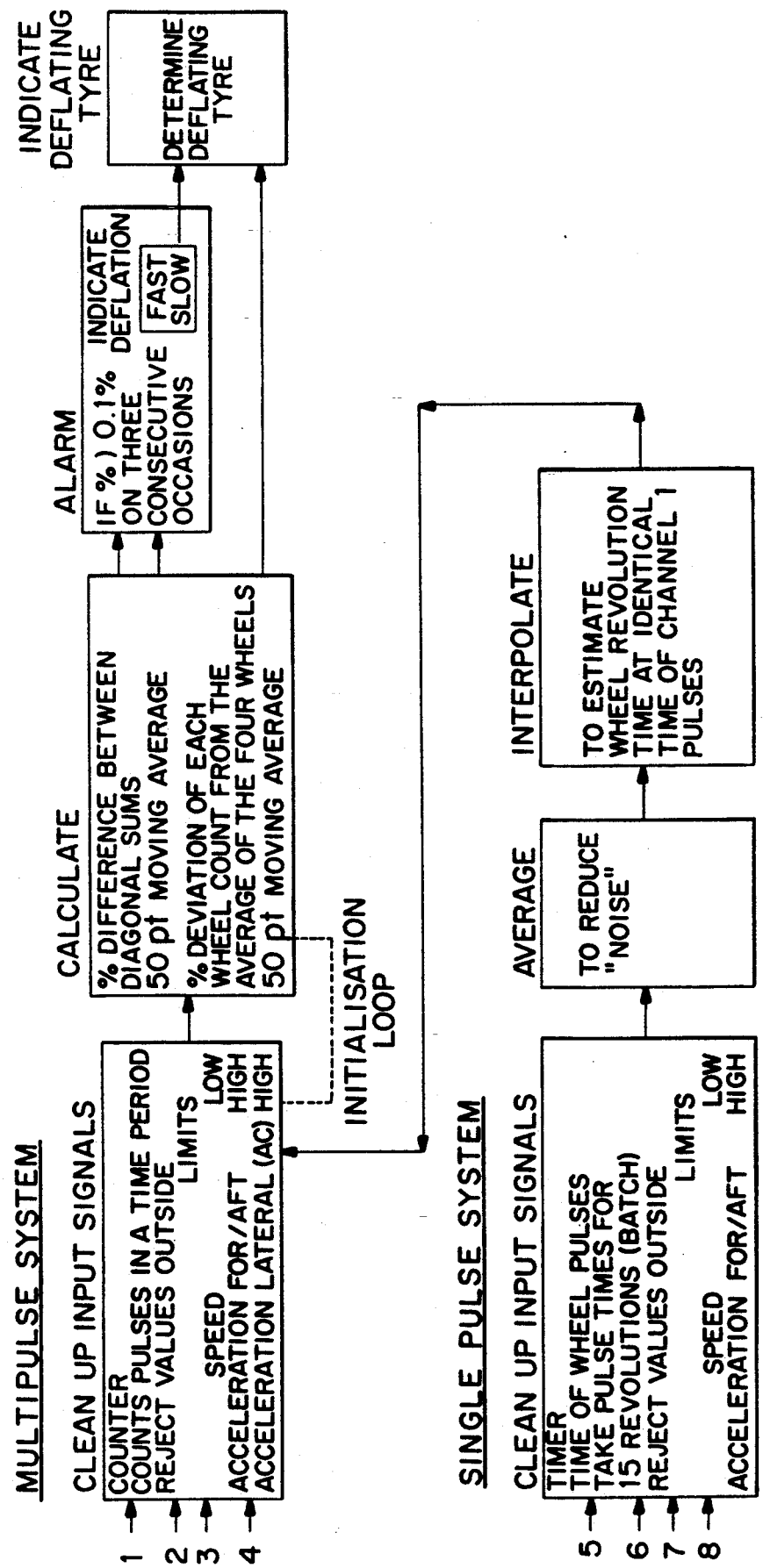

The upper portion of FIG. 1 shows the multi-pulse input signal at the left-hand side and arrows 1 to 4 indicate the multi-pulse input signals from wheels one (left front), two (right front), three (left rear) and four (right rear) on the vehicle. These multi-pulse signals are conveniently forty-eight or ninety-six pulses for each revolution of the wheel.

The lower portion of FIG. 1 shows the input stages for the single pulse monitoring system and arrows 5, 6, 7 and 8 show the single pulse per revolution of each wheel inputs.

It should be appreciated that the inputs 1 to 4 and 5 to 8 may themselves not be taken directly from the wheels but fed through a first processor. The first processor may generate the single pulses for the inputs 5, 6, 7 and 8 from a single input from multi-pulse generators one at each wheel.

Thus, the signals from each wheel on the vehicle are carried through cables to the inputs of the central processing unit and this may be the same computer as is used for the ABS equipment on the vehicle or a separate computer. Four separate indicator lights are provided one for each wheel and these are most conveniently mounted on the vehicle dashboard.

The central processing unit monitors the various signals and compares them to determine whether or not it should give an output signal to indicate that any tire on the vehicle is deflated.

The single pulse system operates by having a timer running at a fixed frequency of 62.5 kilocycles per second and when the first pulse comes from the first wheel, the time is noted. The times of the next fifteen following pulses for the same wheel are also noted giving sixteen times in all. Immediately after the first pulse from the first wheel is received, the time of the next pulse from wheel two is noted followed by fifteen further times for that wheel. The same occurs for wheels three and four so that for each wheel sixteen times are recorded against the same clock. When the last wheel to first signal its movement has completed its sixteenth time, the calculation of the signal immediately begins. Firstly for each wheel fifteen successive times of rotation are calculated and these are then grouped into three groups of five which are each averaged so that three times result and each of which is averaged over five turns to reduce the noise in the system as shown by the second box marked 'Average'.

Interpolation (as shown in box three) is then used to estimate the angular velocity of the four wheels at the same instant chosen to be when the fourth wheel gave its first signal. (This is simply a matter of choice and any instant can be chosen). Thus the angular velocity of all four wheels at the same instant is found by interpolation and these four speeds are passed on to the next stage in the processing unit.

The processing unit also carries out the multi-pulse system calculation as shown in the top left-hand box in FIG. 1. Here the four input 1, 2, 3 and 4 are counted and monitored for a predetermined time period which is typically six seconds although this predetermined time period can be less.

Simultaneously the processing unit calculates lateral and longitudinal accelerations for the vehicle using the multi-pulse input signals by comparing the angular velocity signals for the wheels on each side of the vehicle and then comparing the signals from the front and rear pair of wheels with the forward speed calculated from the mean of the angular velocity of all four wheels. The lateral and longitudinal acceleration figures are compared with predetermined limit values for the vehicle concerned and if these figures are greater than these predetermined figures, the system is inhibited and the deflation warning calculation is not carried out.

The determination of the G figures when calculation is inhibited is determined for the particular vehicle concerned and is largely determined by the amount of weight transfer due to these accelerations. Excessive weight transfer causes radius changes in the wheels similar to a puncture and so this effect must be allowed for. Thus false deflation warning signals due to the weight transfer are avoided.

Assuming the system has determined there are no unusual weight transfers occurring, the system then proceeds to calculate an error signal by calculating the percentage difference between the diagonal sums of the angle of velocities of the wheels. The processing unit does this for both types of input signals, both multi-pulse and single pulse, using the same method for each. However, in the case of the multi-pulse signal, the system calculates from counts in the preset time period which in this case is six seconds and in the case of the single pulse system, the system calculates by using the interpolated wheel speeds and looking at three separate calculation periods which means that over fifteen revolutions of the wheel are checked in this example.

The system looks for a percentage difference between the diagonal sums greater than 0.05 and less then 0.6% and then the system knows that there is a deflation on one of the wheels. The system then calculates the percentage deviation of the angular velocity of each wheel from the average of the four wheels and this allows the system to determine which of the wheels is deflated assuming the percentage difference of the sums of the diagonals has landed in the claimed range. The sensing of which particular wheel is deflated is determined by the different signal of one wheel from the average being greater than 0.1%.

The system uses the same type of calculation for both multi-pulse and single pulse systems and chooses which to signal or sense according to the speed of the vehicle which is calculated from the average angular velocity. Thus the system may choose the best monitoring method to apply at any time and thus is able to maximise the sensitivities and detection times for low and high speeds.

In an alternative arrangement the system both multi- and single-pulse calculations continuously run and if both multi-pulse and single pulse systems give indications of a puncture and both indicate the same wheel then the alarm is operated and indicator lights are lit to show that a particular wheel has deflated.

With either method, because different size tires can be fitted to the vehicle and the changes in rolling radius due to correction of normal tire pressures, an initialisation step is built in to the system. This embodiment includes a manually- or semi-automatically operated trip which causes the deflation warning system to go through a calibration routine in which it measures the speeds of the four wheels and compares them to calculate the necessary constants for the deflation warning system calculations which are then used subsequently throughout the use of the vehicle.

Changing a tire or the tires on a vehicle requires for this initialization to be repeated to ensure that the system correctly operates for the particular set of tires fitted. Initialisation can be at a single speed or may be at two or more speeds according to the types of tires which may be fitted to the vehicle and their gross properties at high speeds.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described our invention what we claim is:

1. A method of detecting a partially deflated pneumatic tire on a vehicle having four tires each mounted on a wheel comprising the steps of:
   (a) sensing the angular velocity of each wheel and producing four signals proportional thereto;
   (b) processing the four signals in a processing unit which subtracts a first sum of the signals from one pair of diagonally opposite wheels from a second sum of the signals from the other pair of diagonally opposite wheels;
   (c) sensing when the magnitude of the result of the processing at said step (b) is between 0.05% and 0.6% of the mean of said first and second sums to produce a signal factor; and (d) operating a warning device, when said signal factor is present, to indicate a tire is partially or completely deflated, wherein the angular velocity of each wheel is measured simultaneously by a pulse generator providing a digital signal of more than twenty pulses per revolution of the wheel, the angular velocities derived from the single pulse signals being interpolated to provide the angular velocity of each wheel at the same instant, and a second signal of a single pulse per revolution of the wheel and the two angular velocity signals are both used.

2. A method according to claim 1 further comprising the steps of comparing the signals for each of the four wheels in turn with the signals from each of the other wheels by said processing unit, sensing when one of said signals is different from the average of all four signals by more than 0.1% by said processing unit and in the event of that signal factor and the other sensed signal factors calculated from the sums being as specified, operating the warning device by using the second signal factor to determine which wheel is deflated.

3. A method according to claim 1 further comprising the step of selecting which of the angular velocity measuring systems to use for monitoring tire deflation according to the speed of the vehicle calculated from one of said systems.

4. A method according to claim 3 wherein the single pulse system is selected at low vehicle speeds and the multi-pulse system is selected at high vehicle speeds.

5. A method according to claim 1 wherein the single pulse system and the multi-pulse system are used in parallel at all times and the processing unit compares the result of both monitoring systems for indicating a deflation only when both systems indicate a deflation in a tire.

6. A method according to claim 1 wherein the two angular velocity signals are derived from a single multiple digital signal generator for each wheel, the single pulse signal being obtained by omitting intermediate pulses in each revolution.

7. A method according to claim 1 wherein the two angular velocity signals are derived from two separate signal generators at each wheel.

8. A system for detecting a partially deflated pneumatic tire on a vehicle having four tires each mounted on a wheel, comprising:

signal generating means for sensing the angular velocity of each wheel and producing four signals proportional thereto;

a processing unit for processing said four signals by subtracting a first sum of the signals from one pair of diagonally opposite wheels from a second sum of the signals from the other pair of diagonally opposite wheels;

sensing means for sensing when the magnitude of the result from said processing unit is between 0.05% and 0.6% of the mean of said first and second sums to produce a signal factor;

a pulse generator for simultaneously measuring the angular velocity of each wheel to provide a digital signal of more than twenty pulses per revolution of the wheel, the angular velocities derived from the single pulse signals being interpolated to provide the angular velocity of each wheel at the same instant, and a second signal of a single pulse per revolution of the wheel and the two angular velocity signals are both used; and a warning device for operating to indicate a tire is partially or completely deflated when said signal factor is present.

9. A system according to claim 8, wherein said processing unit also compares the signals for each of the four wheels in turn with the signals from each of the other wheels, senses when one of said signals is different from the average of all four signals by more than 0.1% and operates said warning device by using said second signal factor to determine which wheel is deflated when that signal factor and the other sensed signal factors calculated from the sums as specified.

10. A system according to claim 8, wherein said processing unit further selects which the angular velocity measuring systems to use for monitoring tire deflation according to the speed of the vehicle calculated from one of said systems.

11. A system according to claim 10, wherein the single pulse system is selected at low vehicle speeds and the multi-pulse system is selected at high vehicle speeds.

12. A system according to claim 8, wherein the single pulse system and the multi-pulse system are used in parallel at all times and said processing unit compares the result of both monitoring systems for indicating a deflation only when both systems indicate a deflation in a tire.

13. A system according to claim 8, wherein the two angular velocity signals are derived from a single multiple digital signal generator for each wheel, the single pulse signal being obtained by omitting intermediate pulses in each revolution.

14. A system according to claim 8, wherein the two angular velocity signals are derived from two separate signal generators at each wheel.

* * * * *